Dec. 2, 1930. H. R. COOK 1,783,356
CONDUIT CLAMP FOR AN OUTLET BOX
Filed April 9, 1928
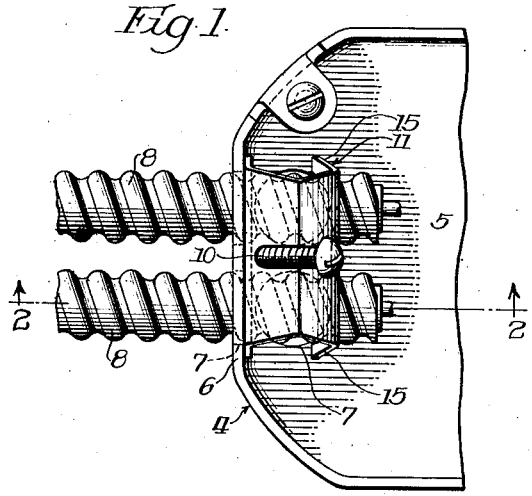
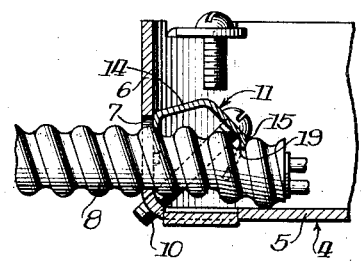
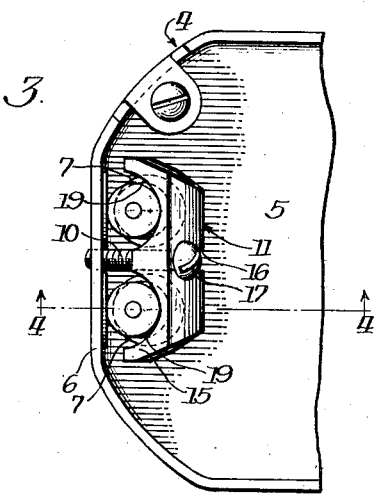
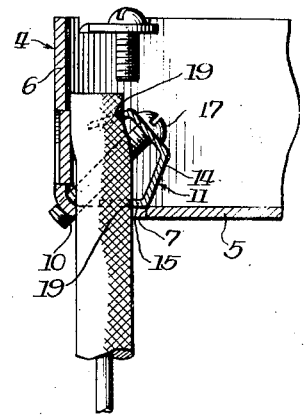
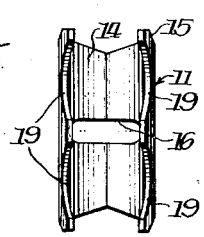
Inventor
Herbert Ray Cook
By Christahl Parker Carlson
Attys Patented Dec. 2, 1930

1,783,356

UNITED STATES PATENT OFFICE

HERBERT RAY COOK, OF CHICAGO, ILLINOIS, ASSIGNOR TO JEFFERSON ELECTRIC COMPANY, OF CHICAGO, ILLINOIS, A CORPORATION OF ILLINOIS

CONDUIT CLAMP FOR AN OUTLET BOX

Application filed April 9, 1928. Serial No. 268,405.

This invention pertains generally to outlet boxes and in particular relates to a clamping means for securing a conduit or cable in an outlet box.

It has been customary in this art to provide a separate means for each set of knockout holes in an outlet box, for clamping a cable in the box, or else a detachable clamp has been furnished with the box which clamp must be attached in position to correspond with the proposed use of a certain set of knockouts. In one case the number of parts necessary, and consequently the cost of the assembly, is excessive, and in the other case time and labor are wasted in the re-positioning and adjustment of the clamp.

The primary object of the invention is to provide a universal clamp for an outlet box which clamp is capable of securing a conduit entering the box through any one of a plurality of knockout holes.

Another object is to provide, in an outlet box having a pair of walls meeting and joined at a corner and having knockout holes in each wall adjacent the corner, a new and improved clamp shiftably positioned on an adjustable screw device so arranged as to permit the insertion of a conduit or conduits into the box through either of said walls.

Another object is to provide a universal clamp embodying means to clamp a conduit entering through a knockout hole in either one of two side walls against one side of the knockout hole and against the other of said walls, and to close more completely the knockout hole through which the conduit enters.

Another object is to provide a universal clamping yoke primarily adapted for clamping two conduits in place and arranged to facilitate the use of the yoke to secure a single conduit.

Other objects and advantages will become apparent from the following description taken in connection with the accompanying drawings, in which:

Figure 1 is a fragmentary view looking into the open side of an outlet box embodying the preferred form of the invention, showing a pair of conduits entering the box through the side wall thereof.

Fig. 2 is a sectional view taken along the line 2—2 of Fig. 1.

Fig. 3 is a view similar to Fig. 1, showing a different type of conductor entering the box through the bottom wall thereof.

Fig. 4 is a sectional view taken along the line 4—4 of Fig. 3.

Figs. 5 and 6 are front and side views respectively of the clamping member shown in Figs. 1 to 4.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

For the purpose of disclosure herein I have shown an outlet box, generally designated as 4, having a base or bottom wall 5, and side walls 6, each of which meet and are joined to the base 5 at a corner. A plurality of pairs of knockout holes 7 are positioned in the side walls and in the bottom wall adjacent the side walls to provide optional inlets for conduits 8.

To secure the ends of a conduit in fixed relation to the box 4, clamping means is provided positioned within the box and associated with an adjustable anchoring or applying device so as to be shiftable relatively to the box to permit insertion of a conduit through a knockout hole in either of two adjacent walls. In the present instance the applying device consists of a headed screw 10 engaging the box at the intersection of a side wall 6 and the bottom wall 5 and extending inwardly of the box 4 so as substantially to bisect the angle between the two walls.

The clamping means preferably consists of a yoke 11 shiftably positioned on the screw 10 and extending in both directions therefrom so that it will serve to clamp a pair of conduits 8 extending into the box one on each side of the screw. In its preferred form the yoke 11 is of substantially U-shaped cross section, as shown in Figs. 2 and 4, with a web portion 14 and having side flanges 15 which serve to engage a conduit transversely thereof at points spaced longitudinally of the conduit 8. To provide for shifting of the yoke 11 relatively to the box 4 and the screw 10, a transverse slot 16 is provided for the screw in the web portion 14 of the yoke, through which slot the screw extends into engagement with the box. In clamping the yoke on a conduit, the head 17 of the screw 10 engages the web portion 14 of the channel and to provide a similar uniform seat for the screw head in the different clamping positions of the yoke, the web portion 14 is, in the present embodiment, bent to a slightly V-shaped cross section.

When the yoke 11 is in the form of a channel, as herein shown, its width is preferably such that when the yoke is in clamping relation to conduits entering through either one of the adjacent walls, as for example the wall 6 in Figs. 1 and 2, one of the flanges 15 will engage the conduits adjacent said wall, thus serving to close more completely the openings and to clamp the conduits against the other side of the openings, while the other of the flanges 15 will engage the conduits at a point spaced from the wall 6 and will thus serve to clamp them firmly against the bottom wall.

To prevent lateral displacement of the conduits thus clamped, the flanges 15 are preferably formed with notches 19 therein which fit down over the conduits and engage the sides thereof. The provision of such notches also serves to facilitate the use of the yoke to clamp a single conduit.

From the foregoing description it will be apparent that the invention provides a novel clamp of simple and economical construction adapted to be shiftably positioned in an outlet box so as to permit a conduit to be inserted into the box through either of two adjacent walls and to be readily secured in position by the clamp.

It will also be apparent that the invention provides a novel universal clamp for an outlet box serving in either of its clamping positions to close more completely the opening through which the conduit enters the box and to clamp the conduit firmly against an adjacent wall.

I claim as my invention:

1. The combination with an outlet box having side and bottom walls with knockout holes therein adjacent their point of joining, a headed anchoring screw engaging the intersection of said walls from within said box and positioned so as substantially to bisect the angle between said walls, a clamping member loosely positioned on said screw and shiftable to permit insertion of a conduit into said box through either of said knockout holes, and engaging portions on said member at the opposite edges thereof positioned so that when said anchoring screw is tightened one of said portions will engage such a conduit near its end to clamp it against the adjacent wall while the other of said portions will engage the conduit adjacent the hole through which it extends so as more completely to close said hole and clamp the conduit against the opposite edge of said hole.

2. An outlet box having, in combination, a pair of intersecting walls each having a knockout hole adjacent their common edge, a clamping member shiftably positioned in said box so as to permit a conduit to be inserted into said box through the knockout hole in either of said walls, and means engaging said member and said box operable to apply said clamping member, said member having spaced engaging portions arranged when said clamping member is applied so that one of said portions will engage such a conduit adjacent the hole through which it enters so as more completely to close said hole and clamp said conduit against the opposite edge of said hole, while the other of said portions engages said conduit at a substantial distance from said hole to clamp said conduit firmly against the other of said walls.

3. An outlet box having, in combination, a pair of adjoining walls each having a knockout hole adjacent the corner, a clamping member shiftably positioned in said box to permit insertion of a conduit through the knockout hole in either of said walls, means engaging said member and said box operable to apply said clamping member, and portions on said member arranged so that when said member is applied one portion serves more completely to close the hole through which a conduit enters the box while the other of said portions serves to engage and clamp the conduit against the other wall.

4. The combination with an outlet box having a pair of adjoining walls each of which has a pair of knockout holes adjacent the other wall, a clamping member shiftably positioned in said box to engage and clamp in a similar manner a pair of conduits inserted into said box through either pair of knockout holes, and means engaging said box and said member operable to apply said clamping member, said clamping member having flanges with notches therein to engage the sides of said conduits to prevent lateral displacement thereof.

5. An outlet box having, in combination, a base wall and an intersecting side wall each having a pair of knockout holes formed therein adjacent said intersection, and means mounted in said box for clamping a pair of conduits extending into said box through either of said pairs of knock-out holes, said clamping means comprising a screw threaded into said box at substantially the intersection of said walls and occupying a position substantially bisecting the angle between said walls, and a conduit-engaging member having an aperture formed therein through which said screw extends, said member having a portion at one side of said screw constituting a fulcrum and also having a web extending from the other side of said screw over the exposed sides of a pair of conduits entering through one of said walls and toward the wall through which the conduits enter the box, and a flange extending from said web along said wall and movable by said screw into clamping engagement with a pair of conduits entering the knock-out holes in said wall, said web serving to transmit to said flange the clamping force applied by said screw to move the flange into such clamping engagement.

6. The combination of a forwardly opening outlet box formed by side and rear walls intersecting at substantially right angles, said box having a knockout hole formed therein with its forward edge lying in said side wall, a screw engaging said box adjacent said hole and occupying a position substantially bisecting the angle between said walls with the head of said screw accessible within the box, and a clamp on said screw, said clamp being formed from sheet metal and having a clamping flange substantially parallel to said side wall and said screw being operable to hold said flange snugly against said wall and to move said clamp bodily along said side wall to bring said flange into clamping engagement with a conduit extending through said hole, said flange serving to more completely close said hole about the conduit.

7. The combination of a forwardly opening outlet box formed by side and rear walls intersecting substantially at right angles to each other, said box having a pair of adjacent knockout holes formed therein with their forward edges lying in said side wall, a screw symmetrically positioned relatively to said two holes and engaging said box so as to occupy a position substantially bisecting the angle between said side and rear walls, and a sheet metal clamp on said screw of substantially U-shaped cross section, one side of which is engaged by said screw, the other side of said U being formed to provide spaced notches to engage a pair of conduits extending through said pair of holes, said screw being operable to hold said other side of the U snugly against said side wall and to move it along said side wall to clamp a pair of conduits extending through said holes.

In testimony whereof, I have hereunto affixed my signature.

HERBERT RAY COOK.